(12) United States Patent
Tsai et al.

(10) Patent No.: US 12,332,556 B2
(45) Date of Patent: Jun. 17, 2025

(54) HEAT DISSIPATION MODULE AND PROJECTION DEVICE

(71) Applicant: Coretronic Corporation, Hsin-Chu (TW)

(72) Inventors: Te-Ying Tsai, Hsin-Chu (TW); Jia-Hong Dai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 600 days.

(21) Appl. No.: 17/827,830

(22) Filed: May 30, 2022

(65) Prior Publication Data

US 2022/0382136 A1 Dec. 1, 2022

(30) Foreign Application Priority Data

Jun. 1, 2021 (CN) .......................... 202121206495.5

(51) Int. Cl.
*G03B 21/16* (2006.01)
*F25D 17/06* (2006.01)
*G03B 21/20* (2006.01)

(52) U.S. Cl.
CPC ........... *G03B 21/16* (2013.01); *F25D 17/067* (2013.01); *G03B 21/204* (2013.01)

(58) Field of Classification Search
CPC .............................. G03B 21/16; G03B 21/204
See application file for complete search history.

(56) References Cited

U.S. PATENT DOCUMENTS

| | | | |
|---|---|---|---|
| 6,481,854 B1 * | 11/2002 | Sugawara | G02F 1/133385 353/57 |
| 2003/0095349 A1 * | 5/2003 | Inamoto | H04N 9/3141 348/E5.143 |
| 2005/0019165 A1 * | 1/2005 | Fujimori | F04D 29/327 416/223 R |
| 2015/0029472 A1 * | 1/2015 | Lin | H04N 9/3144 353/56 |
| 2016/0219256 A1 * | 7/2016 | Tsai | G02B 26/008 |
| 2018/0066835 A1 * | 3/2018 | Kobayashi | H04N 9/3158 |
| 2018/0095348 A1 * | 4/2018 | Asano | G03B 21/16 |
| 2020/0225564 A1 * | 7/2020 | Sato | G03B 21/14 |

FOREIGN PATENT DOCUMENTS

| | | |
|---|---|---|
| CN | 202065917 U | 12/2011 |
| CN | 110441980 A | 11/2019 |
| TW | I308254 B | 4/2009 |

* cited by examiner

*Primary Examiner* — Bao-Luan Q Le

(57) ABSTRACT

A heat dissipation module is for a wheel module with a motor. The heat dissipation module includes a supporting member and a fan. The supporting member has a supporting portion, a fixing portion and connecting portions. The fixing portion is located in a ventilation hole of the supporting portion and connected to the supporting portion by the connecting portions. The fixing portion has opposite first and second side surfaces. The first side surface is connected to the motor. The fan is disposed on the second side surface. The fan has an air outlet facing the ventilation hole. On a plane parallel to the first side surface, the air outlet and the ventilation hole partially overlap, a cross-sectional area of the ventilation hole is greater than that of the fixing portion, and the cross-sectional area of the fixing portion is greater than or equal to that of the motor.

10 Claims, 8 Drawing Sheets

HEAT DISSIPATION MODULE AND PROJECTION DEVICE

CROSS-REFERENCE TO RELATED APPLICATION

This application claims the priority benefit of China application serial no. 202121206495.5, filed on Jun. 1, 2021. The entirety of the above-mentioned patent application is hereby incorporated by reference herein and made a part of this specification.

FIELD OF THE INVENTION

The invention relates to a heat dissipation module, and more particularly to a heat dissipation module for a projection device and a projection device using the heat dissipation module.

BACKGROUND OF THE INVENTION

The type of light source used in projection devices has evolved from ultra high pressure mercury lamps (UHP lamps), light emitting diodes (LEDs) to laser diodes (LDs) with the market demand for projection device brightness, color saturation, service life, non-toxic environmental protection, etc. Due to the high cost of current high-brightness red laser diodes and green laser diodes, the blue laser diodes are usually used as the light source to reduce the cost, and a wavelength conversion element is disposed on the transmission path of the excitation beam provided by the light source. The wavelength conversion element is disposed on a turntable and has a plurality of wavelength conversion blocks with different emission wavelengths. By a driving of a motor, the turntable rotates so that each wavelength conversion block can be irradiated by the excitation beam in turn, thereby converting part of the excitation beam (e.g., blue light) into other color lights (e.g., yellow light and green light) needed to form the projected image.

A bracket is usually provided in the projection device to fix the motor and the wavelength conversion element, and a fan is also provided to dissipate heat from the wavelength conversion element. However, the prior-art bracket may block the airflow blowing to the wavelength conversion element, resulting in poor heat dissipation effect. In addition, the above-mentioned airflow may also generate eddy airflow and cause noise after hitting the bracket.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a heat dissipation module, which can solve the problems of insufficient heat dissipation effect and noise and maintain sufficient structural strength.

The invention provides a projection device, which has good durability and reduces noise during operation.

Other advantages and objects of the invention may be further illustrated by the technical features broadly embodied and described as follows.

In order to achieve one or part or all of the above-mentioned purposes or other purposes, the heat dissipation module provided by the invention is suitable for a wheel module. The wheel module includes a motor. The heat dissipation module includes a supporting member and a fan. The supporting member has a supporting portion, a fixing portion and a plurality of connecting portions. The supporting portion has a ventilation hole. The fixing portion is located in the ventilation hole and is connected to the supporting portion by the plurality of connecting portions. The fixing portion has a first side surface and a second side surface opposite to each other. The first side surface is used to connect to the motor. The fan is disposed on one side of the second side surface of the fixing portion. The fan has an air outlet, and the air outlet faces the ventilation hole. On a plane parallel to the first side surface, the air outlet and the ventilation hole at least partially overlap, a cross-sectional area of the ventilation hole is greater than a cross-sectional area of the fixing portion, and the cross-sectional area of the fixing portion is greater than or equal to a cross-sectional area of the motor.

In order to achieve one or part or all of the above-mentioned purposes or other purposes, the projection device provided by the invention includes an illumination system, a light valve and a projection lens. The illumination system is configured to provide an illumination beam. The light valve is disposed on a transmission path of the illumination beam to convert the illumination beam into an image beam. The projection lens is disposed on a transmission path of the image beam to project the image beam. The illumination system includes an excitation light source, a wheel module and a heat dissipation module. The excitation light source is configured to provide an excitation beam. The wheel module is located on a transmission path of the excitation beam and includes a motor. The heat dissipation module is used for supporting the wheel module and dissipating heat from the wheel module.

The heat dissipation module of the invention adopts the supporting portion with the ventilation hole, and the fixing portion is located in the ventilation hole. Therefore, the airflow generated by the fan can pass through between the fixing portion and the hole wall of the ventilation hole to the wheel module, thereby improving the heat dissipation effect and reducing the noise generated by the air hitting the supporting member. In addition, the fixing portion located in the ventilation hole is connected to the supporting portion by the connecting portions, so the supporting member of the invention can maintain sufficient structural strength to support the wheel module. On the other hand, because of adopting the above-mentioned heat dissipation module, the projection device of the invention can have good durability and reduce noise during operation.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
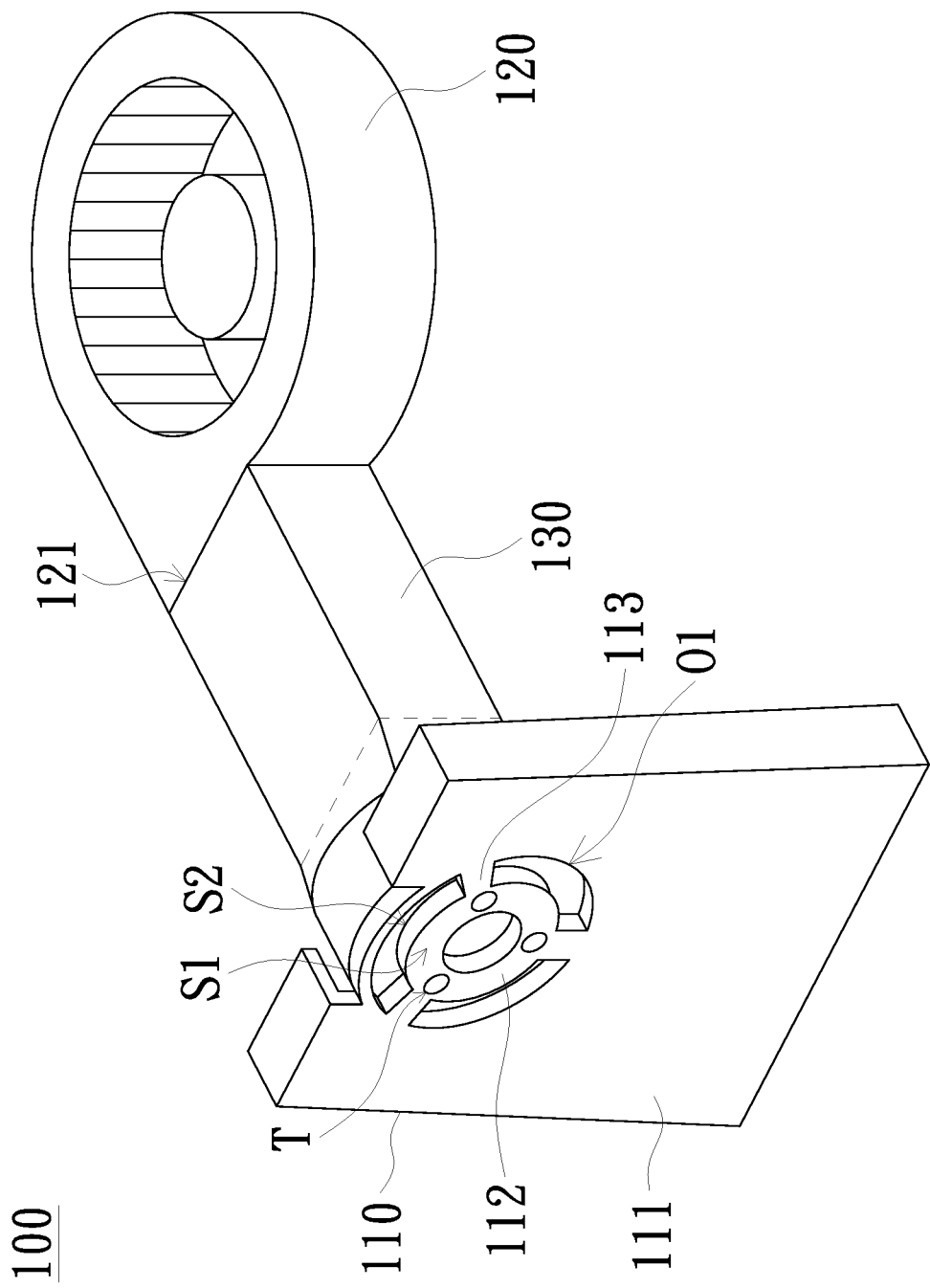
FIG. 1 is a schematic diagram of a heat dissipation module according to an embodiment of the invention.
Figure 2:
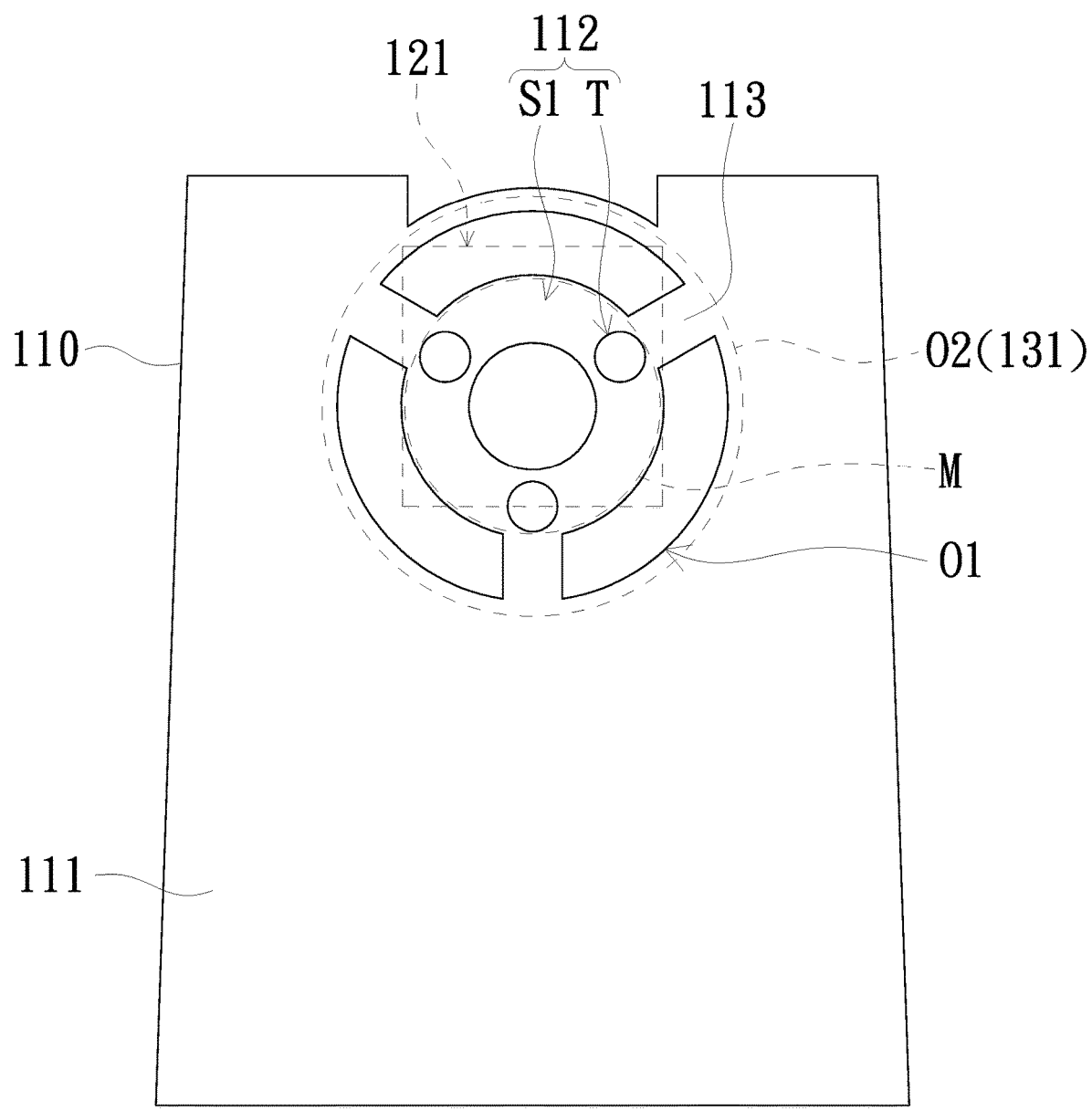
FIG. 2 is a schematic diagram of the supporting member in FIG. 1.

FIG. 1 is a schematic diagram of a heat dissipation module according to an embodiment of the invention. FIG. 2 is a schematic diagram of the supporting member in FIG. 1. Please refer to FIGS. 1 and 2. The heat dissipation module 100 includes a supporting member 110 and a fan 120. The supporting member 110 has a supporting portion 111, a fixing portion 112 and a plurality of connecting portions 113. The supporting portion 111 has a ventilation hole O1, and the ventilation hole O1 penetrates the supporting portion 111. The fixing portion 112 is located in the ventilation hole O1 and is connected to the supporting portion 111 by the connecting portions 113. The fixing portion 112 has a first side surface S1 and a second side surface S2 (labeled in FIG. 1) opposite to each other. The ventilation hole O1 connects, for example, the first side surface S1 and the second side surface S2. The first side surface S1 can be connected to a motor M. The fan 120 is disposed on a side of the second side surface S2 of the fixing portion 112. Specifically, the fan 120 is, for example, disposed beside the second side surface S2, but the invention is not limited to this. The fan 120 of this embodiment has an air outlet 121, and the air outlet 121 faces the ventilation hole O1. In detail, the air outlet 121 and the ventilation hole O1 at least partially overlap on a plane parallel to the first side surface S1 as shown in FIG. 2. The cross-sectional area (e.g., the projected area) of the ventilation hole O1 is greater than the cross-sectional area of the fixing portion 112 (e.g., 2 times or more). The cross-sectional area of the fixing portion 112 is greater than or equal to the cross-sectional area of the motor M.

Figure 3:
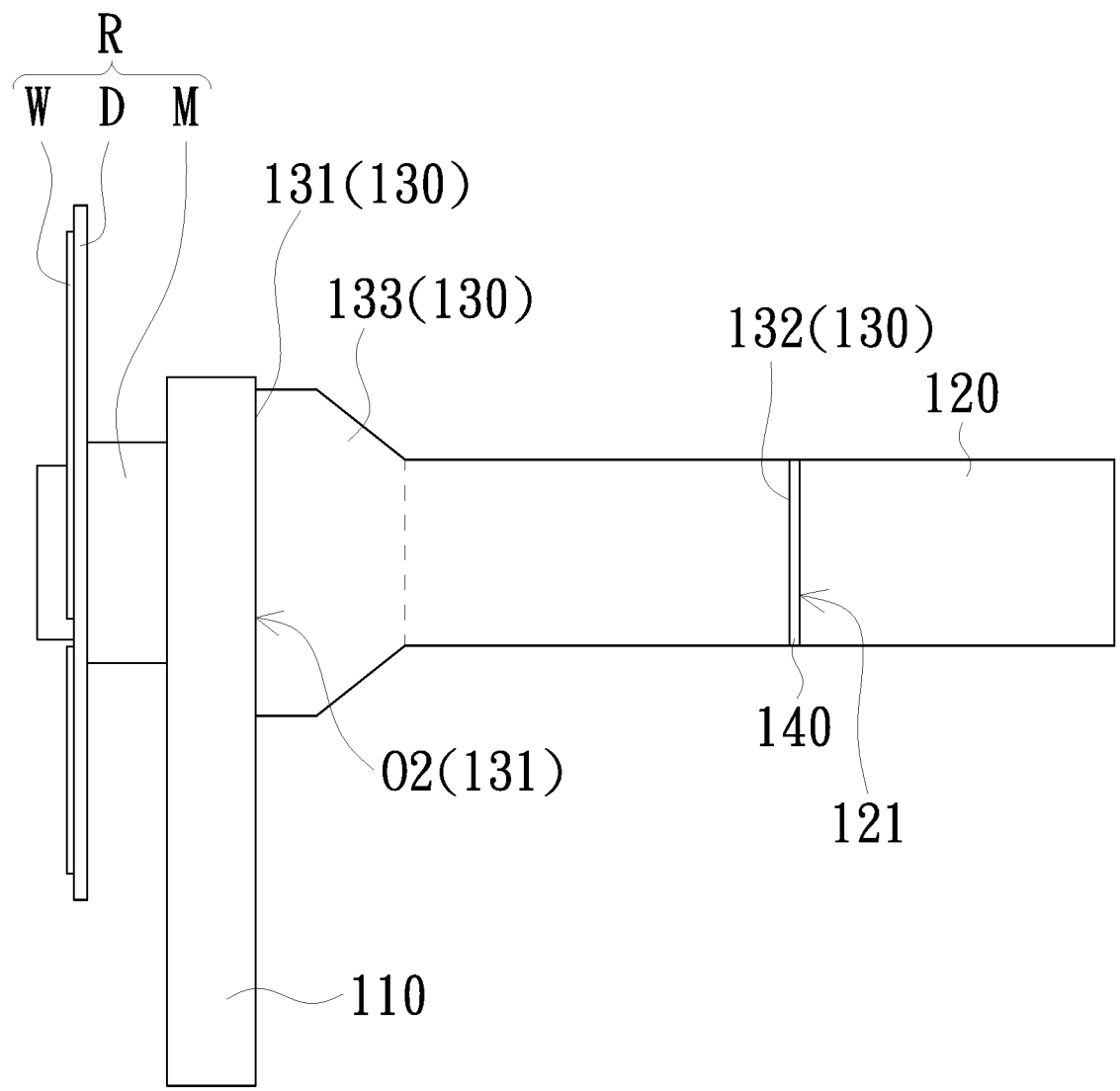
FIG. 3 is a schematic diagram of a wheel module being fixed to the heat dissipation module of FIG. 1.

FIG. 3 is a schematic diagram of a wheel module being fixed to the heat dissipation module of FIG. 1. Please refer to FIGS. 1 to 3. In this embodiment, the heat dissipation module 100 can be used for the wheel module R. The wheel module R includes a motor M, and optionally includes a turntable D and a wavelength conversion element W. The turntable D is connected to the motor M, and the wavelength conversion element W is disposed on the turntable D. The wheel module R of this embodiment is, for example, a fluorescent wheel, and the wavelength conversion element W may include a fluorescent layer, but the invention is not limited to this. For example, the wavelength conversion element W may include a color filter layer in an embodiment where the wheel module R is a color filter wheel.

The fan 120 of this embodiment can dissipate heat from the turntable D through the ventilation hole O1. The fan 120 may be a blower, but the fan 120 may be an axial fan in other embodiments. In addition, another fan (not shown) can be provided on the side of the wheel module R far away from the fan 120 (e.g., the first side surface S1) to dissipate heat from the wheel module R in different directions, but the invention is not limited to this.

Please refer to FIGS. 1 and 2 again. The shape of the supporting member 110 may include a plate shape. The thickness of the supporting member 110 is, for example, 1.5 mm or more. The material of the supporting member 110 may include aluminum-magnesium alloy or zinc alloy, but the invention is not limited to this. In addition, the supporting portion 111, the fixing portion 112 and the connecting portions 113 of this embodiment may be formed by stamping the supporting member 110, but the invention is not limited to this. The connecting portions 113 of this embodiment are connected to the fixing portion 112 and the hole wall of the ventilation hole O1. The airflow generated by the fan 120 can flow from between the fixing portion 112 and the hold wall of the ventilation hole O1 to the wheel module R (shown in FIG. 3). Furthermore, the shape of the ventilation hole O1 of the supporting portion 111 is, for example, a circle, and the connecting portions 113 are arranged equidistantly from each other along the circumferential direction of the ventilation hole O1, so that the supporting member 110 has a uniform structural strength. The fixing portion 112 of this embodiment may also have a plurality of through holes T (three are shown in FIG. 1, but not limited to this), and the through holes T may be used to fix the motor M. For example, screws (not shown) can pass through the through holes T and are locked to the motor M so that the motor M is fixed on the supporting member 110, but the invention is not limited to this. In addition, the through holes T can be respectively disposed corresponding to the connecting portions 113. For example, the corresponding through hole T and the connecting portion 113 are located in the same radial direction of the ventilation hole O1, so that the structural strength of the supporting member 110 can be more uniform. The specific quantities of the through holes T and the connecting portions 113 can be adjusted according to actual requirements and are not limited to those shown in the figure. In particular, the volume or area of the connecting portions 113 is reduced as much as possible as long as the connecting portions 113 can provide sufficient structural strength, so as to increase the area where the airflow generated by the fan 120 can pass through the ventilation hole O1. For example, on a plane parallel to the first side surface S1, the cross-sectional area of the ventilation hole O1 is 5 times (or 10 times) or more the cross-sectional area of the connecting portions 113.

Compared with the prior art, the heat dissipation module 100 of this embodiment adopts the supporting portion 111 with the ventilation hole O1, and the fixing portion 112 is located in the ventilation hole O1. Therefore, the airflow generated by the fan 120 can pass through between the fixing portion 112 and the hole wall of the ventilation hole O1 to the wheel module R, thereby improving the heat dissipation effect and reducing the noise generated by the air hitting the supporting member 110. In addition, the fixing portion 112 located in the ventilation hole O1 is connected to the supporting portion 111 by the connecting portions 113, so the supporting member 110 of this embodiment can maintain sufficient structural strength to support the wheel module R.

Please refer to FIGS. 1 to 3. The heat dissipation module 100 may further include a draft tube 130. The draft tube 130 has a first end 131 and a second end 132 opposite to each other. The first end 131 is connected to the supporting member 110, and the second end 132 is connected to the air outlet 121 of the fan 120. Thus, the airflow generated by the fan 120 can be more concentratedly guided to the ventilation hole O1, thereby increasing the airflow utilization rate. In detail, the draft tube 130 of this embodiment extends in a straight direction, but the invention is not limited to this.

Furthermore, the first end 131 of the draft tube 130 of this embodiment may have a draft tube opening O2. The shape of the air outlet 121 may be different from the shape of the ventilation hole O1, therefore, the draft tube 130 may further include a transition portion 133 in addition to an extension portion having a cross-sectional area approximately the same as that of the air outlet 121. The first end 131 is disposed at the transition portion 133, and the draft tube 130 can be connected to the supporting member 110 by the transition portion 133. Furthermore, the cross-sectional area of the draft tube opening O2 disposed at the transition portion 133 may be greater than or equal to the cross-sectional area of the ventilation hole O1 in this embodiment, so as to improve the airflow utilization rate. The specific shape of the transition portion 133 is not limited to that shown in the figure. Incidentally, the first end 131 and the second end 132 of the draft tube 130 can be respectively fixed to the transition portion 133 and the fan 120 in an adhesion manner, but the invention is not limited to this.

Please continue to refer to FIG. 3. The heat dissipation module 100 may further include at least one sealing member 140 (one is shown in FIG. 3, but not limited to this). The sealing member 140 may be disposed between the first end 131 and the supporting member 110 and/or between the second end 132 and the air outlet 121 to provide sealing and shock-absorbing functions. Specifically, the sealing member 140 of this embodiment is disposed between the second end 132 and the air outlet 121, but the invention is not limited to this. For example, another sealing member may also be disposed between the first end 131 and the supporting member 110 in another embodiment. In addition, the sealing member 140 of this embodiment is disposed in a clamping manner, but the invention is not limited to this. Incidentally, the material of the sealing member 140 may include silica gel, rubber or metal, but the invention is not limited to this.

Figure 4:
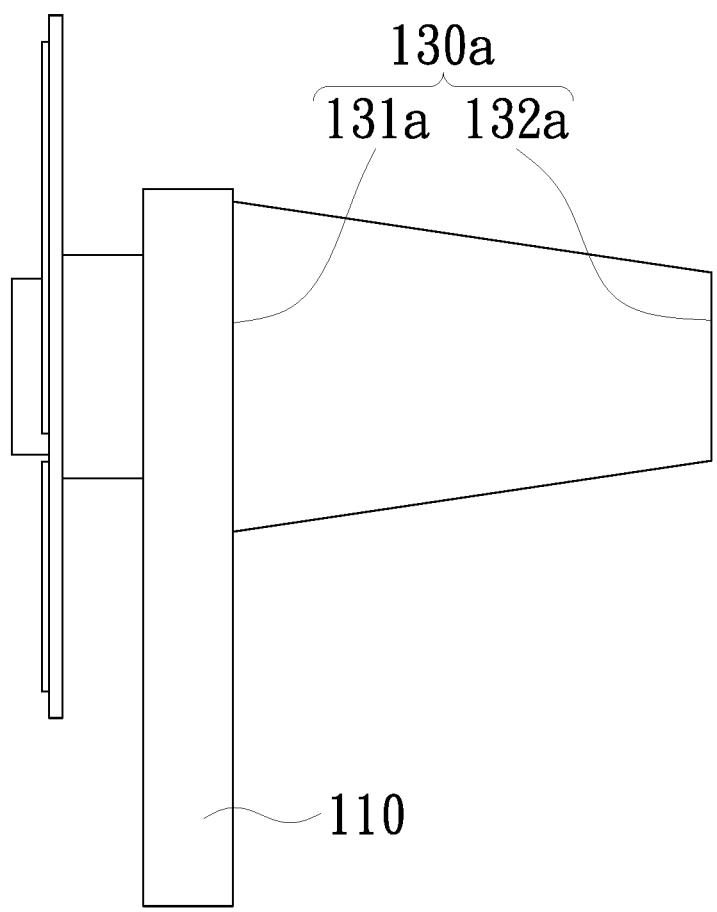
FIG. 4 is a schematic diagram of a heat dissipation module according to another embodiment of the invention.
Figure 5:
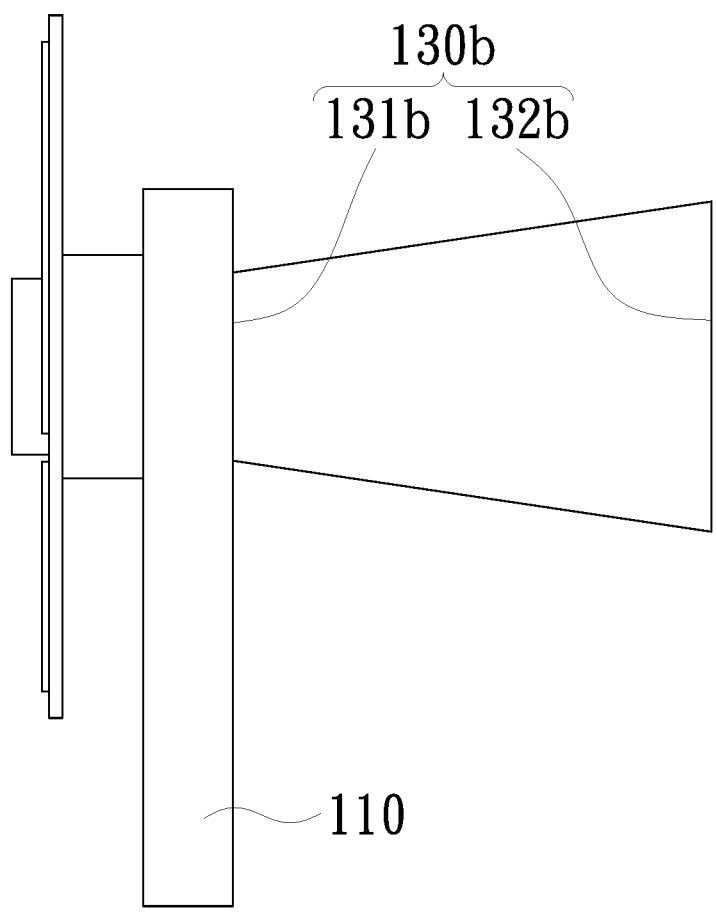
FIG. 5 is a schematic diagram of a heat dissipation module according to still another embodiment of the invention.

The draft tube can have different shapes in other embodiments of the invention. Please refer to FIGS. 4 and 5. FIG. 4 is a schematic diagram of a heat dissipation module according to another embodiment of the invention. FIG. 5 is a schematic diagram of a heat dissipation module according to still another embodiment of the invention. In the heat dissipation module 100a of FIG. 4 (the fan is omitted in FIG. 4), the cross-sectional area of the draft tube 130a may gradually increase from the second end 132a to the first end 131a to increase the area where the airflow passes. On the contrary, in the heat dissipation module 100b of FIG. 5 (the fan is omitted in FIG. 5), the cross-sectional area of the draft tube 130b may gradually decrease from the second end 132b to the first end 131b to increase the flow rate of the airflow, thereby facilitating local heat dissipation. In the embodiments of FIGS. 4 and 5, the ratio of the cross-sectional area of the first end 131a/131b to the cross-sectional area of the second end 132a/132b can be between 0.1 and 10 to avoid the excessive flow resistance of the airflow, but the invention is not limited to this. It should be noted that in the embodiments of FIGS. 4 and 5, because the first end 131a/131b and the second end 132a/132b of the draft tube 130a/130b can respectively correspond to the shapes of the air outlet and the ventilation hole, there is no need to provide the transition portion as shown in FIG. 3.

Figure 6:
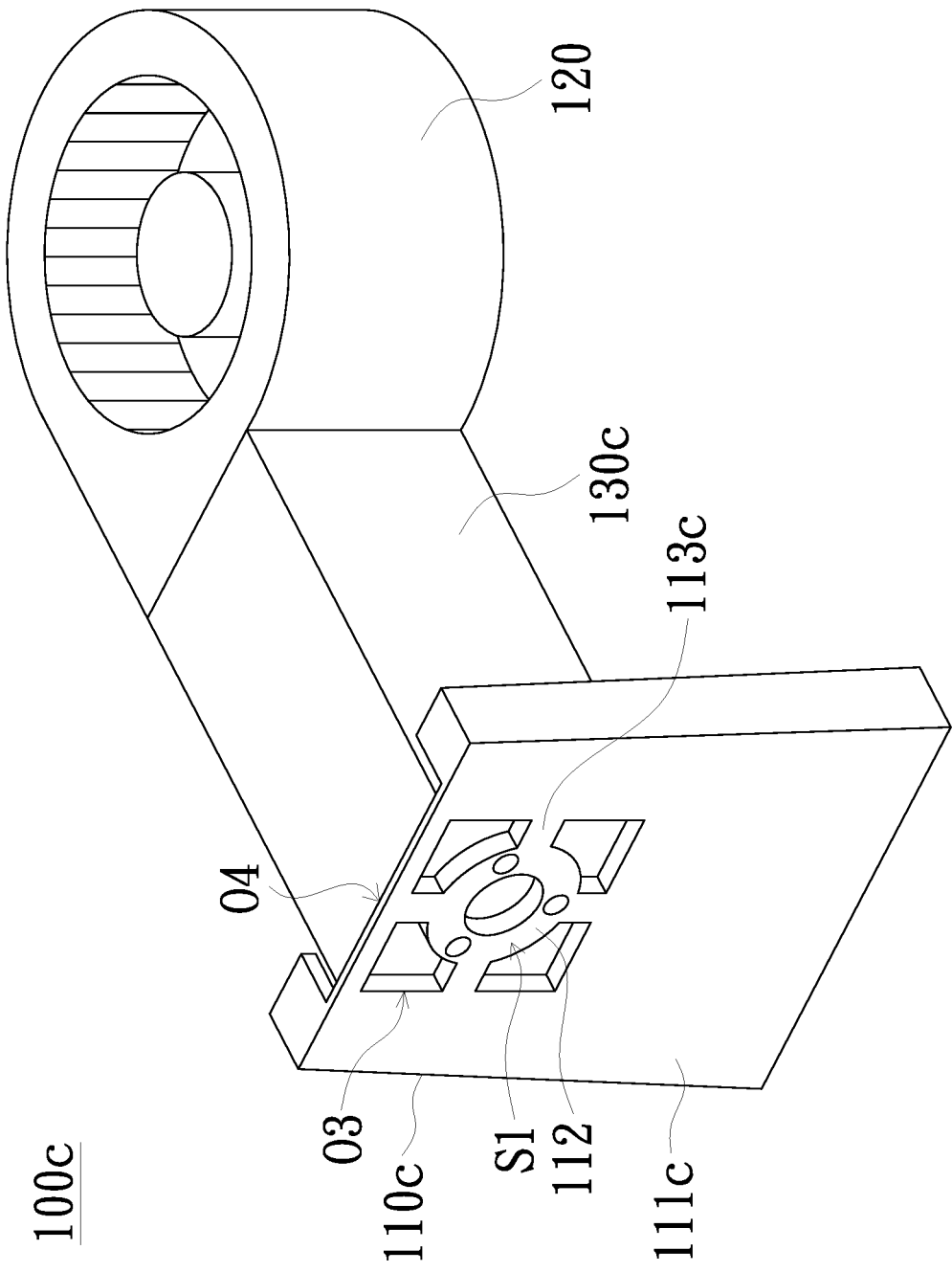
FIG. 6 is a schematic diagram of a heat dissipation module according to yet another embodiment of the invention.
Figure 7:
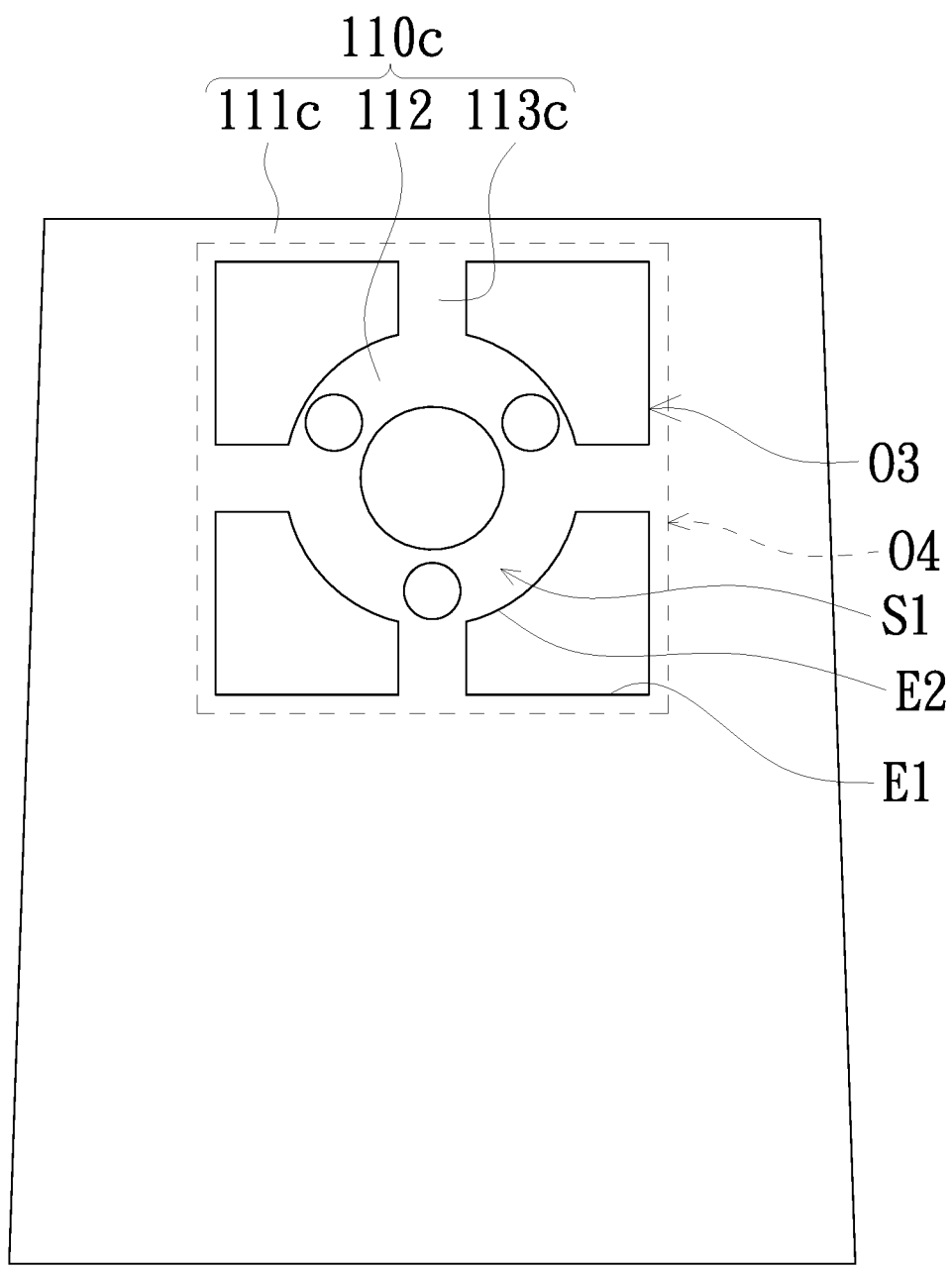
FIG. 7 is a schematic diagram of the supporting member in FIG. 6.

The shape of the ventilation hole O1 in the previous embodiments is circular, but the invention is not limited to this. The shape of the ventilation hole in other embodiments may be polygonal. For example, please refer to FIGS. 6 and 7. FIG. 6 is a schematic diagram of a heat dissipation module according to yet another embodiment of the invention. FIG. 7 is a schematic diagram of the supporting member in FIG. 6. The shape of the ventilation hole O3 of the supporting portion 111c may be square in the heat dissipation module 100c of FIGS. 6 and 7, but the invention is not limited to this. In detail, the ventilation hole O3 may have a hole edge E1 (labeled in FIG. 7), and the fixing portion 112 may have an outer edge E2 (labeled in FIG. 7) corresponding to the hole edge E1. The connecting portion 113c is respectively connected to the closest parts of the outer edge E2 and the hole edge E1 to each other, so that the length of the connecting portion 113c can be shortened and therefore the supporting member 110c can maintain the structural strength sufficient to support the wheel module R (shown in FIG. 3). As shown in FIG. 7, the ventilation hole O3 is square and the fixing portion 112 is circular, therefore, the connecting portion 113c is connected to the outer edge E2 of the fixing portion 112 from the middle of each side of the hole edge E1 of the ventilation hole O3. Incidentally, in this embodiment, the shape of the draft tube opening O4 is similar to the shape of the ventilation hole O3 (the shape of the air outlet of the fan 120 is similar to the shape of the ventilation hole O3), therefore, the draft tube 130c (shown in FIG. 6) of this embodiment may extend, for example, in a straight direction and maintain approximately the same cross-sectional area without being provided with the transition portion 133 as shown in FIG. 3. The cross-sectional area of the draft tube opening O4 may be greater than or equal to the cross-sectional area of the ventilation hole O3 to improve the airflow utilization rate. Furthermore, the draft tube opening O4 of the draft tube 130c overlaps with the ventilation hole O3 on a plane parallel to the first side surface S1 as shown in FIG. 7, therefore, a large amount of airflow generated by the fan 120 can flow to the wheel module R through the ventilation hole O3, thereby increasing the airflow utilization rate. Incidentally, the draft tube 130c of this embodiment can be fixed to the supporting member 110c in a locking manner, but the invention is not limited to this.

Figure 8:
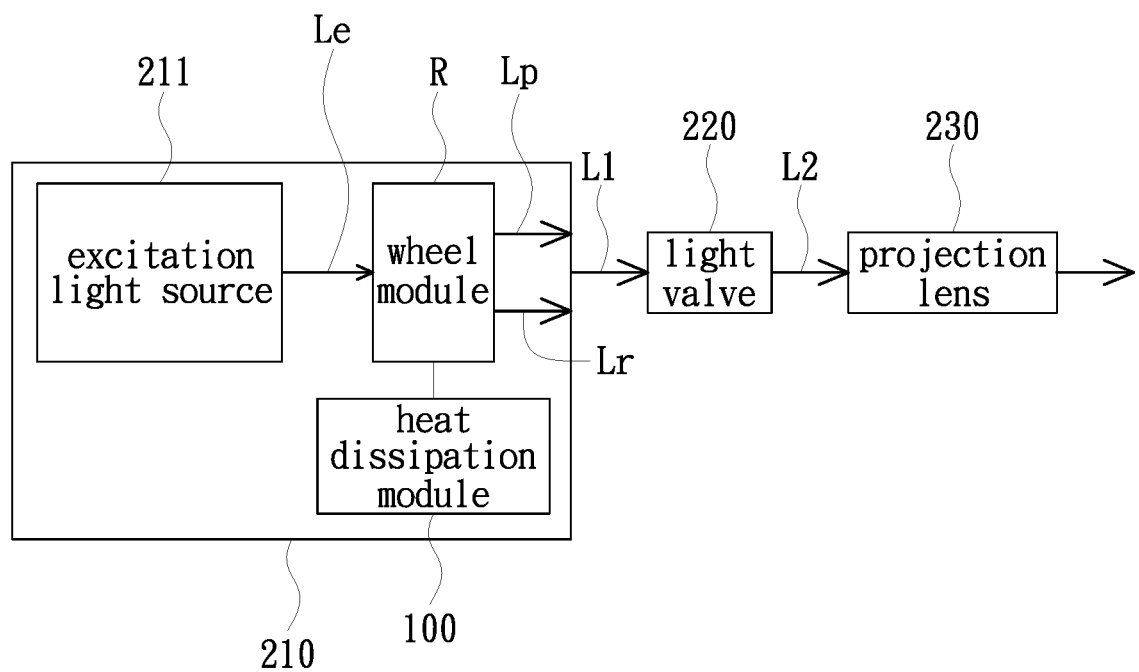
FIG. 8 is a schematic diagram of a projection device according to an embodiment of the invention.

FIG. 8 is a schematic diagram of a projection device according to an embodiment of the invention. Please refer to FIGS. 1, 3 and 8 together. The projection device 200 includes an illumination system 210, a light valve 220 and a projection lens 230. The illumination system 210 is configured to provide an illuminating beam L1. The light valve 220 is disposed on the transmission path of the illumination beam L1 and is configured to convert the illumination beam L1 into an image beam L2. The projection lens 230 is disposed on the transmission path of the image beam L2 and is configured to project the image beam L2. The illumination system 210 of this embodiment includes an excitation light source 211, a wheel module R and a heat dissipation module 100. The excitation light source 211 is configured to provide an excitation beam Le. The wheel module R is located on the transmission path of the excitation beam Le and includes a motor M. The heat dissipation module 100 can support the wheel module R and dissipate heat from the wheel module R. It can be understood that the heat dissipation module 100 can also be replaced with the heat dissipation module 100a, 100b or 100c in other embodiments.

The excitation light source 211 of the illumination system 210 includes, for example, a light emitting diode (LED) or a laser diode (LD), wherein the quantity of the light emitting diode or laser diode may be one or more. For example, the light emitting diodes (or laser diodes) may be arranged in a matrix when the quantity of light emitting diodes (or laser diodes) is plural. The wavelength conversion element W of the wheel module R is disposed on the transmission path of the excitation beam Le to convert a part of the excitation beam Le into a converted beam Lp. In addition, the other part of the excitation beam Le is not converted into the converted beam Lp (indicated by the beam Lr in the figure). At least one of the beam Lr and the converted beam Lp form the illuminating beam L1. Because the features of the heat dissipation module 100 have been described in detail in the foregoing, no redundant detail is to be given herein.

The light valve 220 is, for example, a digital micromirror device (DMD), a liquid crystal on silicon (LCoS) or a liquid crystal display (LCD), but the invention is not limited to this. In addition, this embodiment does not limit the quantity of light valves. For example, the projection device 200 of this embodiment may adopt a single-chip liquid crystal display panel or a three-chip liquid crystal display panel structure, and the invention is not limited to this.

The projection lens 230 includes, for example, one or more optical lenses, and the diopters of the optical lenses may be the same or different from each other. For example, the optical lens may include various non-planar lenses such as biconcave lenses, biconvex lenses, meniscus lenses, convex-concave lenses, plano-convex lenses, and plano-concave lenses, or any combination of the above-mentioned non-planar lenses. On the other hand, the projection lens 230 may also include a flat optical lens. The invention does not limit the specific structure of the projection lens 230.

Because of adopting the above-mentioned heat dissipation module 100, the projection device 200 of this embodiment can have good durability and reduce noise during operation, compared with the prior art.

To sum up, the heat dissipation module of the invention adopts the supporting portion with the ventilation hole, and the fixing portion is located in the ventilation hole. Therefore, the airflow generated by the fan can pass through between the fixing portion and the hole wall of the ventilation hole to the wheel module, thereby improving the heat dissipation effect and reducing the noise generated by the air hitting the supporting member. In addition, the fixing portion located in the ventilation hole is connected to the supporting portion by the connecting portions, so the supporting member of the invention can maintain sufficient structural strength to support the wheel module. On the other hand, because of adopting the above-mentioned heat dissipation module, the projection device of the invention can have good durability and reduce noise during operation.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the

What is claimed is:

1. A heat dissipation module used for a wheel module, the wheel module comprising a motor, and the heat dissipation module comprising a supporting member and a fan, wherein:

the supporting member has a supporting portion, a fixing portion and a plurality of connecting portions, the supporting portion has a ventilation hole, the fixing portion is located in the ventilation hole and is connected to the supporting portion by the plurality of connecting portions, the fixing portion has a first side surface and a second side surface opposite to each other, and the first side surface is connected to the motor; and the fan is disposed on one side of the second side surface of the fixing portion, the fan has an air outlet, and the air outlet faces the ventilation hole, wherein on a plane parallel to the first side surface, the air outlet and the ventilation hole at least partially overlap, a cross-sectional area of the ventilation hole is greater than a cross-sectional area of the fixing portion, and the cross-sectional area of the fixing portion is greater than or equal to a cross-sectional area of the motor.

2. The heat dissipation module according to claim 1, further comprising a draft tube, wherein the draft tube has a first end and a second end opposite to each other, the first end is connected to the supporting member, and the second end is connected to the air outlet.

3. The heat dissipation module according to claim 2, wherein a cross-sectional area of the draft tube gradually increases or decreases from the second end to the first end.

4. The heat dissipation module according to claim 2, wherein a ratio of a cross-sectional area of the first end to a cross-sectional area of the second end is between 0.1 and 10.

5. The heat dissipation module according to claim 2, wherein the first end of the draft tube has a draft tube opening, and a cross-sectional area of the draft tube opening is greater than or equal to the cross-sectional area of the ventilation hole.

6. The heat dissipation module according to claim 2, further comprising at least one sealing member disposed between the first end and the supporting member and/or between the second end and the air outlet.

7. The heat dissipation module according to claim 2, wherein the draft tube further comprises a transition portion, and the draft tube is connected to the supporting member by the transition portion.

8. The heat dissipation module according to claim 1, wherein a shape of the ventilation hole is circular, and the plurality of connecting portions are arranged equidistantly from each other along a circumferential direction of the ventilation hole.

9. The heat dissipation module according to claim 1, wherein the fixing portion further has a plurality of through holes for fixing the motor.

10. A projection device, comprising an illumination system, a light valve and a projection lens, the illumination system being configured to provide an illumination beam, the light valve being disposed on a transmission path of the illumination beam to convert the illumination beam into an image beam, the projection lens being disposed on a transmission path of the image beam to project the image beam, and the illumination system comprising an excitation light source, a wheel module and a heat dissipation module, wherein:

the excitation light source is configured to provide an excitation beam;

the wheel module is located on a transmission path of the excitation beam and comprises a motor; and the heat dissipation module comprises a supporting member and a fan, wherein:

the supporting member has a supporting portion, a fixing portion and a plurality of connecting portions, the supporting portion has a ventilation hole, the fixing portion is located in the ventilation hole and is connected to the supporting portion by the plurality of connecting portions, the fixing portion has a first side surface and a second side surface opposite to each other, and the first side surface is connected to the motor; and the fan is disposed on one side of the second side surface of the fixing portion and has an air outlet, and the air outlet faces the ventilation hole, wherein on a plane parallel to the first side surface, the air outlet and the ventilation hole at least partially overlap, a cross-sectional area of the ventilation hole is greater than a cross-sectional area of the fixing portion, and the cross-sectional area of the fixing portion is greater than or equal to a cross-sectional area of the motor.

* * * * *